United States Patent
Haselberger et al.

(10) Patent No.: US 10,145,399 B2
(45) Date of Patent: Dec. 4, 2018

(54) DEVICE FOR CONNECTING A STRUCTURAL ELEMENT WITH A HOLDING ELEMENT SPACED APART

(71) Applicant: FACC AG, Ried im Innkreis (AT)

(72) Inventors: Christoph Haselberger, St. Florian/Inn (AT); Bernhard Kammerer, Zell an der Pram (AT)

(73) Assignee: FACC AG, Ried im Innkreis (AT)

( * ) Notice: Subject to any disclaimer, the term of this patent is extended or adjusted under 35 U.S.C. 154(b) by 0 days.

(21) Appl. No.: 15/124,008

(22) PCT Filed: Mar. 6, 2015

(86) PCT No.: PCT/AT2015/050060
§ 371 (c)(1),
(2) Date: Sep. 6, 2016

(87) PCT Pub. No.: WO2015/131218
PCT Pub. Date: Sep. 11, 2015

(65) Prior Publication Data
US 2017/0016464 A1     Jan. 19, 2017

(30) Foreign Application Priority Data
Mar. 7, 2014   (AT) .................................. 50167/2014

(51) Int. Cl.
*F16B 43/02*   (2006.01)
*F16B 5/01*    (2006.01)
(Continued)

(52) U.S. Cl.
CPC .................. *F16B 5/01* (2013.01); *B64C 1/12* (2013.01); *B64D 11/02* (2013.01); *F16B 5/0233* (2013.01)

(58) Field of Classification Search
CPC ............. F16B 5/01; F16B 5/0233; B64C 1/12
(Continued)

(56) References Cited

U.S. PATENT DOCUMENTS 3,510,916 A * 5/1970 Phelan ...................... B64C 1/12
                                                    249/97
3,606,416 A * 9/1971 Hatter ....................... F16B 5/01
                                                    403/408.1
(Continued)

FOREIGN PATENT DOCUMENTS

CN      101898588 A      12/2010
DE      10151383 A1       4/2003
(Continued)

OTHER PUBLICATIONS

International Bureau of WIPO, International Preliminary Report on Patentability Issued in Application No. PCT/AT2015/050060, dated Sep. 22, 2016, WIPO, 10 pages.
(Continued)

*Primary Examiner* — Gary W Estremsky
(74) *Attorney, Agent, or Firm* — McCoy Russell LLP

(57) ABSTRACT

A device for a spaced apart connection of a structural element, in particular made from a fiber-reinforced plastic composite material, with a holding element by means of a connection screw, with a distance compensation element comprising a longitudinal bore for the passage of the connection screw, and with an entraining element arranged in the longitudinal bore, which entraining element can be connected to the connection screw by means of a friction fit, so that the distance compensation element can be transferred into an abutment position bridging the distance between the structural element and the holding element by screwing in of the connection screw, wherein the distance compensation element is connected to an insertion part via a screw connection, which insertion part comprises a fastening sec-
(Continued)

tion that can be arranged within the structural element for bonding with the structural element.

14 Claims, 3 Drawing Sheets

(51) Int. Cl.
*F16B 5/02* (2006.01)
*B64C 1/12* (2006.01)
*B64D 11/02* (2006.01)

(58) Field of Classification Search
USPC .......................................................... 411/546
See application file for complete search history.

(56) References Cited

U.S. PATENT DOCUMENTS

| | | | | |
|---|---|---|---|---|
| 4,981,735 A | * | 1/1991 | Rickson | F16B 5/01 156/92 |
| 5,288,191 A | * | 2/1994 | Ruckert | F16B 5/0233 403/409.1 |
| 5,378,099 A | * | 1/1995 | Gauron | B29C 70/68 411/108 |
| 6,776,566 B2 | | 8/2004 | Kobusch et al. | |
| 7,037,027 B2 | * | 5/2006 | Steinbeck | F16B 5/025 403/296 |
| 8,061,948 B2 | * | 11/2011 | DeGelis | F16B 5/0233 411/32 |
| 8,066,465 B2 | * | 11/2011 | Figge | F16B 5/025 411/34 |
| 8,202,033 B2 | * | 6/2012 | Choi | B62D 25/145 411/535 |
| 8,764,337 B2 | * | 7/2014 | Binder | F16B 5/0233 224/326 |
| 8,864,432 B2 | * | 10/2014 | Figge | F16B 5/025 411/383 |
| 2005/0047893 A1 | * | 3/2005 | Schwarzbich | F16B 5/0233 411/546 |
| 2005/0117966 A1 | | 6/2005 | Steinbeck | |
| 2006/0280579 A1 | * | 12/2006 | Seidl | F16B 5/0233 411/546 |

FOREIGN PATENT DOCUMENTS

| | | |
|---|---|---|
| DE | 102007037242 A1 | 2/2008 |
| DE | 102008055526 A1 | 6/2010 |
| EP | 1304489 A2 | 4/2003 |
| RU | 2401949 C2 | 10/2010 |
| WO | 8200324 A1 | 2/1982 |
| WO | 2013150016 A1 | 10/2013 |

OTHER PUBLICATIONS

State Intellectual Property Office of the People's Republic of China, Office Action and Search Report Issued in Application No. 201580012405.X, dated Apr. 10, 2017, 17 pages.
ISA European Patent Office, International Search Report Issued in Application No. PCT/AT2015/050060, dated May 29, 2015, WIPO, 4 pages.
State Intellectual Property Office of the People's Republic of China, Office Action and Search Report Issued in Application No. 201580012405.X, dated May 25, 2018, 15 pages.

* cited by examiner

DEVICE FOR CONNECTING A STRUCTURAL ELEMENT WITH A HOLDING ELEMENT SPACED APART

CROSS REFERENCE TO RELATED APPLICATIONS

The present application is a U.S. National Phase of International Patent Application Serial No. PCT/AT2015/050060, entitled "DEVICE FOR CONNECTING A STRUCTURAL ELEMENT WITH A HOLDING ELEMENT SPACED APART," filed on Mar. 6, 2015, which claims priority to Austrian Patent Application No. A 50167/2014, filed on Mar. 7, 2014, the entire contents of each of which are hereby incorporated by reference for all purposes.

TECHNICAL FIELD

The invention relates to a device for spaced apart connection of a structural element, in particular made from a fiber-reinforced plastic composite material, with a holding element by means of a connection screw, with a distance compensation element comprising a longitudinal bore for the passage of the connection screw, and with an entraining element arranged in the longitudinal bore, which entraining element can be connected to the connection screw by means of a friction fit, so that the distance compensation element can be transferred into an abutment position bridging the distance between the structural element and the holding element by screwing in the connection screw.

BACKGROUND AND SUMMARY

Furthermore, the invention relates to a structural element, in particular made from a fiber-reinforced plastic composite material.

From DE 10 151 383 A1 an assembly for compensating a tolerance between two components is known. Said assembly comprises a screw which is plugged through the two components. The screw head is supported on the first component. The screw is screwed into a nut on the other component. In addition, a compensating bush is provided, having a through bore and an external thread to match the internal thread of the nut. The compensating bush also comprises a clamping portion, by means of which the compensating bush can be frictionally engaged with the screw, whereas it is rotatable relative to the screw upon overcoming the friction fit. When the screw is plugged in the compensating bush and is rotated, the compensating bush can rotate due to the friction fit. Thereby, the compensating bush is unscrewed from the nut in the opposite direction of the plug-in direction for the purpose of tolerance compensation. When the compensating bush abuts on the first component, the former is screwed with an internal thread for clamping the two components.

DE 10 2008 055 526 A1 and DE 10 2007 037 242 A1 describe other devices of this type.

WO 2013150016 A1 discloses a fastening element for connecting two components with automatic tolerance compensation between the components. The fastening element comprises a base element fixable in an opening of the one component and an adjusting element that can be screwed to the internal thread of the base element via an external thread. Adjacent to the internal thread, the base element comprises a second (internal) thread portion for screwing in a fastening screw having a hand of thread opposite to the hand of thread of the thread. On the inside, the adjustment element comprises entraining elements establishing a friction fit between the screw and the adjusting element upon screwing in of the screw. When the screw is screwed in the thread portion, the adjusting element is rotated via the entraining elements, whereby depending on the rotational direction of the screw the adjusting element is moved away from or towards the base element in axial direction, due to which the tolerance compensation can be obtained. According to an alternative embodiment, the base element can be stuck in the opening of the one component.

In this prior art, the screw head of the screw is supported on the component. As a disadvantage, the component can be damaged by the tightening moment of the screw. This is of particular disadvantage if the component is made from a fiber composite material. In addition, given the lack of space, the known device would be unsuitable for supporting composite components. Finally, the projecting screw head affects the appearance of the visible surface of the component.

Therefore, the known embodiments are not suited for many applications, in particular in the aircraft construction. For reasons of stability and load capacity, it is disadvantageous for the support of structural components made from composite materials if the connection screw is fixed with the screw head on the upper side of the composite material. In addition, the tolerance compensation arrangement in the prior art, cf. e. g. DE 101 51 383 A1, is connected to the nut of the holding element. Such an embodiment, however, would be unsuitable or unfavorable for the support of composite components due to lack of space.

Accordingly, the aim of the present invention is to indicate a device of the above cited kind, by means of which the problems of the prior art can be reduced or avoided. In particular, it is the aim of the invention to design the device for a tolerance compensation in the case of structural elements made from composite materials.

To achieve this aim, a device and a structural element are provided, the device for a spaced apart connection of a structural element with a holding element by means of a connection screw, with a distance compensation element comprising a longitudinal bore for the passage of the connection screw, and with an entraining element arranged in the longitudinal bore, in which the entraining element is connected to the connection screw by means of a friction fit, so that the distance compensation element is transferred into an abutment position bridging the distance between the structural element and the holding element by screwing in of the connection screw, wherein the distance compensation element is connected to an insertion part via a screw connection, in which the insertion part comprises a fastening section that is arranged within the structural element for bonding with the structural element.

In accordance with the invention, the distance compensation element is therefore connected to an insertion part via a screw connection, which insertion part comprises a fastening section that can be arranged within the structural element for bonding with the structural element.

In the mounted state, the fastening section of the insertion part is therefore accommodated in a recess of the structural element and immovably fixed to the adjacent material of the structural element by means of an adhesive joint. Therefore, the insertion part preferably does not project beyond the outer surface of the structural element facing away from the holding element. Therefore, the fastening section is preferably essentially completely integrated in the structural element which preferably comprises a panel made from a composite material. In addition, a surface material, in particular a veneer can be provided on the structural element comprising the composite panel. The insertion part comprises an adhesive surface on the fastening section for bonding with a corresponding adhesive surface of the structural element limiting the recess of the structural element. The embodiment according to the invention has the particular advantage of that a point loading in the structural element is avoided, which in the prior art is caused by the connection screw supported on the outer surface of the component. In addition, a particular robust embodiment is provided, complying with high safety standards. In addition, it is of advantage that the visible surface of the structural element is hardly affected by the arrangement of the distance compensation element, since the projecting screw head in the prior art is missing. In addition, by the connection of the distance compensation element to the insertion part—in contrast to the connection to the nut of the holding element in the prior art—an especially space-saving embodiment can be obtained, which is of particular advantage for structural elements made from fiber-reinforced plastic composite materials (composite components). In this embodiment, the holding element can be equipped with a comparatively small nut. Therefore, the device according to the invention can be used with special advantages for the mounting of structural elements made from fiber-reinforced plastic material, which structural elements in particular have a wall strength or thickness of 5 to 15 mm.

To bridge the distance between the structural element and the holding element, it is favorable that the distance compensation element can be transferred from a distance position toward the holding element into the abutment position on the holding element upon screwing in of the connection screw. In this embodiment, the distance compensation element is unscrewed from the insertion part when the connection screw is screwed in. Accordingly, the rotational movement of the connection screw is converted into an extension of the device, the free end of the distance compensation element forming the abutment surface moving toward the holding element. Upon reaching the abutment position, the friction fit between the connection screw and the entraining element is overcome, so that the connection screw can be twisted with respect to the entraining element. Subsequently, the connection screw can be fixed to a thread of the holding element.

To obtain a stable adhesive joint between the insertion part and the structural element it is favorable if the insertion part comprises at least one fastening flange on the fastening section, which flange can be arranged between the outer surfaces of the structural element for bonding of the insertion part with the structural element, the at least one fastening flange preferably extending essentially perpendicularly to the longitudinal axis of the longitudinal bore. In the manufacture, the fastening flange is fixed to the structural element by means of an adhesive joint, thus obtaining an intimate bond. On the one hand, the arrangement of the fastening flange facilitates the application of the adhesive. On the other hand, the fastening flange effects a particularly reliable safeguard against torsional forces applying on the device during operation. Preferably, the fastening flange is arranged essentially flush with a surface of a composite panel of the structural element.

One embodiment is particularly favorable, in which the insertion part comprises two especially parallel and spaced-apart fastening flanges on the fastening section. Thus, a particularly stable arrangement of the insertion part within the recess of the structural element can be obtained. The fastening flanges are preferably arranged essentially completely between the outer surfaces of the structural element, at least one of the fastening flanges expediently terminating essentially flush with a surface of a composite-material panel of the structural element. A cavity is formed between the fastening flanges for the reception of the adhesive, by means of which the insertion part is mounted in the structural element. For supporting the structural element, first of all the structural element can be provided with a bore having the outer diameter of the fastening flanges. After inserting the insertion part the ring-shaped cavity between the fastening flanges can be filled with adhesive. The adhesive between the fastening flanges bonds with the material, in particular the composite material, of the structural element.

For bonding of the insertion part with the structural element it is favorable if at least one of the fastening flanges comprises at least one opening, in particular at least one notch on an outer edge of the fastening flange for introducing the adhesive between the fastening flanges. One of the fastening flanges preferably has two opposite notches for filling in of the adhesive. Depending on the design, the two fastening flanges may also comprise at least one opening each for insertion of the adhesive.

To determine the maximum adjustability of the device it is favorable if stops for limiting the movement of the distance compensation element are provided in the axial direction relative to the insertion part. Therefore, the device may be adjusted by twisting the connection screw between a shorter state, in which the distance compensation element projects less far from the insertion part, and a longer state, in which the distance compensation element projects further from the insertion part, the stops blocking any adjustment of the distance compensation element beyond reaching the shorter or longer state.

For manufacturing reasons, it is preferred if the distance compensation element comprises a receiving opening for detachably receiving an abutment element, by means of which unscrewing the distance compensation element from of the insertion part can be blocked in the mounted state. Due to the detachable arrangement of the abutment element in the receiving opening the device can be mounted and/or removed in a particularly simple manner.

In this embodiment, it is favorable if a particularly U-shaped clip element is provided as an abutment element, which clip element in the mounted state projects into the longitudinal bore of the distance compensation element. The clip element can be inserted with its ends in the corresponding receiving openings of the distance compensation element. In the mounted state, the clip element blocks any adjustment of the distance compensation element beyond reaching the second state of the device, the second state having the maximum length. With respect to a particularly cheap and simple construction the clip element provided may be a wire, in particular with a circular cross-section, the recesses of the distance compensation element being designed accordingly. The clip element is preferably elastically deformable, so that in the mounted state the clip element can be secured against unintentional removal by means of elastic deformation of the ends of the clip element which are plugged through the receiving openings.

For a non-rotatable connection between the connection screw and the distance compensation element upon screwing in the connection screw, it is favorable if a spring element which is elastically deformable by means of the connection screw is provided as an entraining element. In engagement with the connection screw the spring element is deformed elastically, the restoring forces of the spring element effecting a friction fit between the connection screw and the spring element. Upon reaching the abutment position on the holding element, frictional forces will occur between the abutment surface of the distance compensation element and the holding element, so that the friction fit between the connection screw and the spring element is overcome when the connection screw is further twisted. In this state, the connection screw can be fixed in the corresponding thread of the holding element.

To be able to reliably ensure entrainment of the distance compensation element upon screwing in the connection screw, it is of advantage if the spring element is arranged in a holding section of the distance compensation element in a torque-proof and axially immovable manner. For this purpose, it is favorable if the spring element and the longitudinal bore of the distance compensation element have different cross-sectional shapes. Furthermore, the holding section may have a cross-sectional shape that is different from an adjacent portion of the longitudinal bore.

To obtain the friction fit between the connection screw and the distance compensation element it is favorable if the spring element comprises two expansion legs that can be spread by means of the connection screw and are arranged essentially in parallel to one another, which expansion legs are connected to one another via a connecting section. The expansion legs can be pressed outwards in engagement with the connection screw in an essentially perpendicular manner to the principal plane of the expansion legs, the restoring forces of the expansion legs causing a friction fit between the connection screw and the spring element. The connecting section preferably comprises two connecting legs arranged at an obtuse angle to one another, which may facilitate deformation of the expansion portions.

In accordance with a preferred embodiment a bush element is provided as an insertion part, which bush element comprises an internal thread for connection with a corresponding external thread of the distance compensation element. Advantageously, the device is thereby blocked in the abutment position on the holding element against forces in the longitudinal direction of the distance compensation element, so that in operation the device is reliably retained in the abutment position.

The distance compensation element preferably comprises, on the one end, a foot part for abutment on the holding element and, on the other end, a head part comprising the external thread, the foot part and the head part being connected to one another via a longitudinal section having a cross-sectional surface which is smaller in comparison to the foot part and the head part. For manufacturing reasons, it is preferred if the distance compensation element, in particular its head part, foot part, and connecting section, is designed as one piece.

The structural element according to the invention comprises a recess in which the above-described device is glued in place. Accordingly, the fastening section of the insertion part is arranged within the structural element. The structural element may also include several recesses, which are provided with a corresponding number of the devices described above for distance compensation. An especially stable, permanent connection between the insertion part and the structural element may be provided by means of the adhesive joints.

If the fastening section of the insertion part is arranged essentially completely within the recess of the structural element, the device may advantageously be integrated in the structural element.

The advantages of the invention may be used in particular in such applications in which a plate element, in particular a panel for aircraft equipment such as storage compartments, kitchens, lavatories, washrooms, as well as aircraft cladding elements in passenger cabins, is provided, the fastening section of the insertion part being arranged between the outer surfaces of the plate element. Such plate-shaped structural elements may be provided in various applications in the aircraft construction.

The holding element preferably comprises a nut, in particular a clip nut for connection with the connection screw, wherein the nut may preferably have a particularly small size due to the connection of the distance compensation element with the insertion part.

BRIEF DESCRIPTION OF THE FIGURES

Below, the invention will be further illustrated on the basis of preferred embodiments shown in the drawing, however, to which it is not limited. In detail, the drawings show the following.

DETAILED DESCRIPTION

Figure 1:
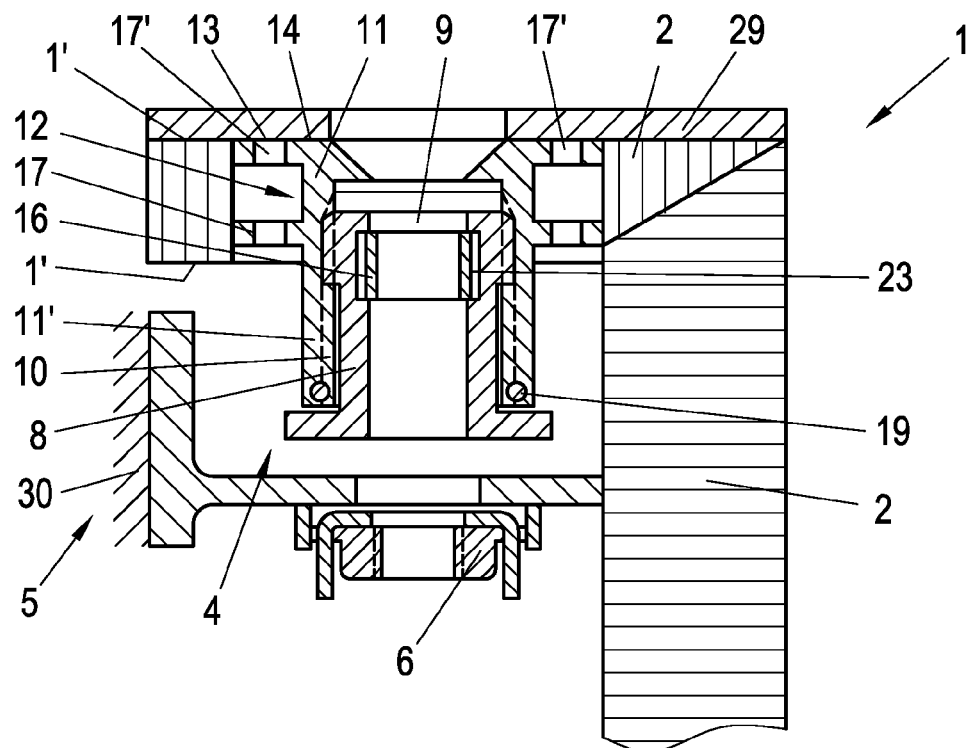
FIG. 1 is a cross-sectional view of a structural element according to the invention, which can be mounted to a holding element by means of a device according to the invention, consisting of an insertion part bonded in the structural element and an unscrewable distance compensation element, the distance compensation element being shown in a distance position before screwing in a connection screw.

FIG. 1 shows a structural element 1 which is used as a storage compartment in the aircraft construction. In particular, the structural element 1 is made from a fiber-reinforced plastic composite material. In the shown design, the structural element 1 comprises to plate elements 2 arranged at right angles. In FIG. 1, on the upper side of the one plate element 2 a surface material 29, for example a veneer is indicated. Furthermore, a device 4 for connection of the structural element 1 with a holding element 5 is provided, which is arranged on a structural body 30 (schematically shown in the drawing). In the shown embodiment, the holding element 5 is designed as a holding clip or bracket, in which a clip nut 6 having a thread for screwing in a connection screw 7 is received.

Furthermore, it can be seen from FIG. 1 that the device 4 comprises a distance compensation element 8 having a central longitudinal bore 9 for the passage of the connection screw 7. The distance compensation element 8 is rotationally connected to an insertion part 11 via a thread connection 10. For this purpose, the insertion part 11 comprises an internal thread, into which a corresponding external thread of the distance compensation element 8 will fit. In the shown embodiment, a bush element 11' is provided as insertion part 11, which bush element 11' comprises the internal thread for connection with the corresponding external thread of the distance compensation element 8.

As can be further seen from FIG. 1, the insertion part 11 comprises a fastening section 12 which is arranged completely within a recess 13 of the structural element 1. The recess 13 is produced by milling out the plate element 2. The fastening section 12 of the insertion part 11 is connected to the structural element 1 by means of an adhesive joint 14.

Figure 2:
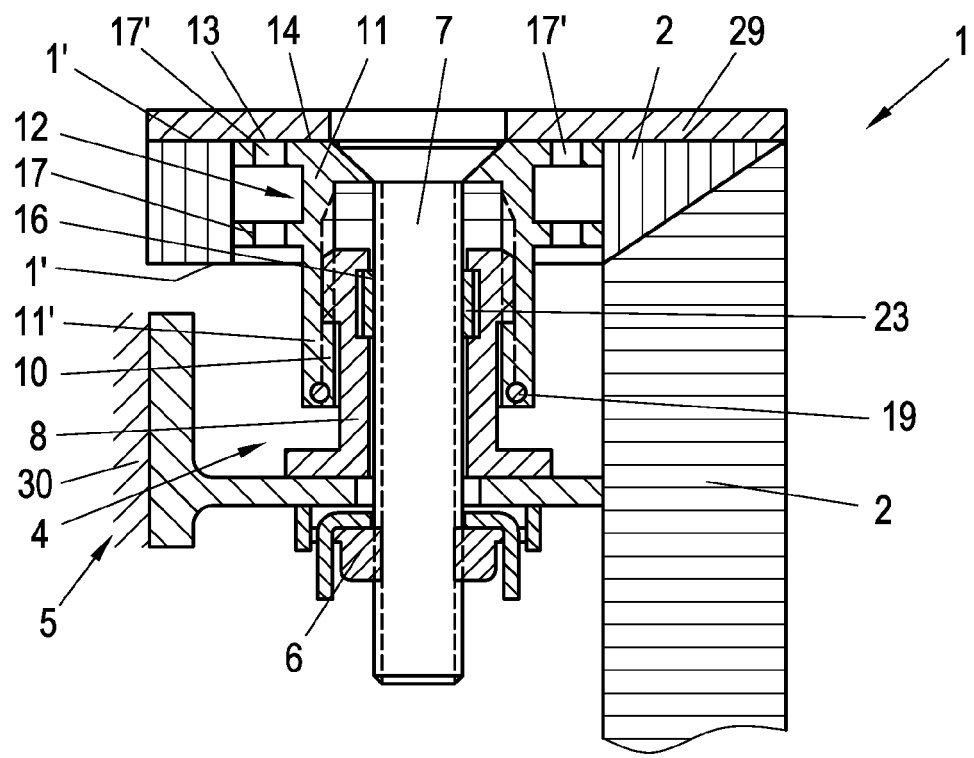
FIG. 2 is a cross-sectional view of the structural element corresponding to FIG. 1, the distance compensation element being positioned in an abutment position on the holding element by screwing in the connection screw.

As can be further seen from FIGS. 1, 2, an entraining element 16 is arranged in the longitudinal bore 9, which entraining element 16 is frictionally engaged with the connection screw 7 upon screwing in the connection screw 7. In this manner, the distance compensation element 8 can be transferred into an abutment position (cf. FIG. 2) bridging the distance between the structural element 1 and the holding element 5 by screwing in of the connection screw 7 starting from a distance position (cf. FIG. 1). In the shown embodiment, the distance compensation element 8 is unscrewed from the insertion part 11 upon screwing in the connection screw 7. The device 4 is transferred from a shorter state corresponding to the distance position (cf. FIG. 4A), in which the distance compensation element 8 projects less far from the insertion part 11, toward the holding element 5 into a longer state (cf. FIG. 4B) corresponding to the abutment position on the holding element 5, in which the distance compensation element 8 projects further from the insertion part 11.

As can be further seen from FIGS. 1, 2, the insertion part 11 comprises on the fastening section 12 two fastening flanges 17, which are arranged for bonding with the structural element 1. The parallel and spaced apart fastening flanges 17 extend essentially perpendicular to the longitudinal axis of the longitudinal bore 9 or essentially perpendicular to the principal plane of the associated plate element 2. In the embodiment according to FIGS. 1, 2, the two fastening flanges 17 each comprise two openings 17', through which the adhesive can be filled into the volume between the fastening flanges 17. Accordingly, the insertion part 11 is connected laterally to the structural element 1 via the bonding connection between the fastening flanges 17. The fastening flanges 17 are arranged between the outer surfaces 1' of the structural element 1. Accordingly, the fastening section 12 is completely integrated in the structural element 1.

FIGS. 3 to 7 show a further embodiment essentially differing from the one shown in FIGS. 1, 2 in that only the upper fastening flange 17 comprises openings 17' for inserting the adhesive. Moreover, the openings 17' according to FIGS. 3 to 7 are designed as opposite notches on the outer edges of the fastening flange 17. Regarding the other features, the embodiment of FIGS. 3 to 7 corresponds to the one given in FIGS. 1, 2, so that reference will be made to the above explanations.

Figure 3:
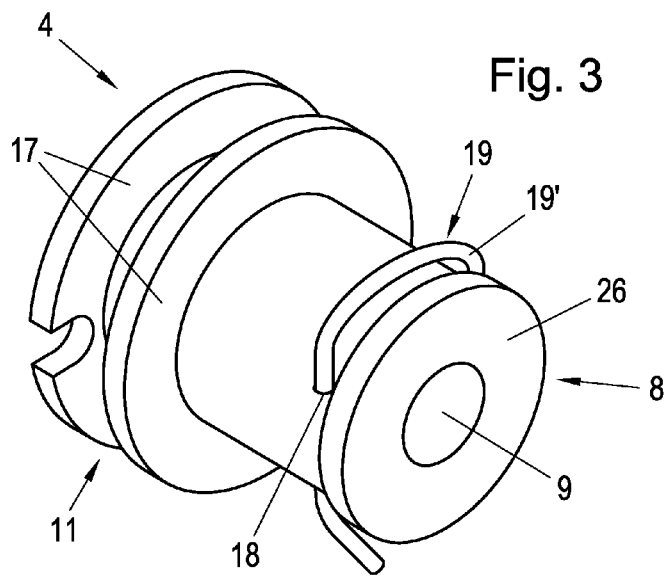
FIG. 3 is a diagrammatic view of a device slightly modified as compared to FIGS. 1, 2 for connection of the structural element with a holding element.
Figure 6:
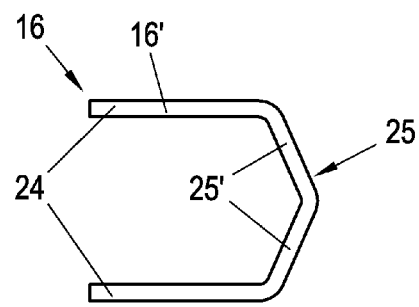
FIG. 6 is a view of the entraining element according to FIG. 5, which is designed as a U-shaped clip element.
Figure 5:
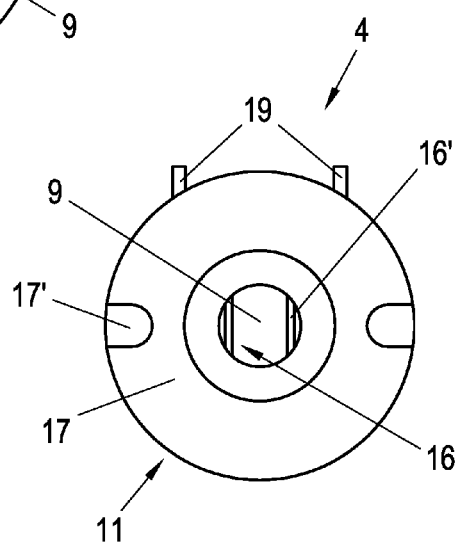
FIG. 5 is a view of the device according to the invention in the direction of a longitudinal bore of the distance compensation element, an entraining element being arranged in the longitudinal bore for friction fit between the connection screw and the distance compensation element.
Figure 7:
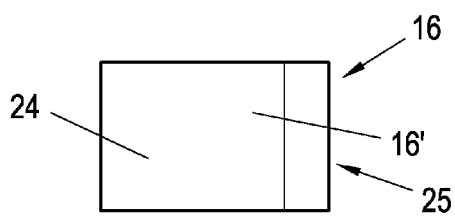
FIG. 7 is a side view of the entraining element according to FIGS. 5, 6.
Figure 4A:
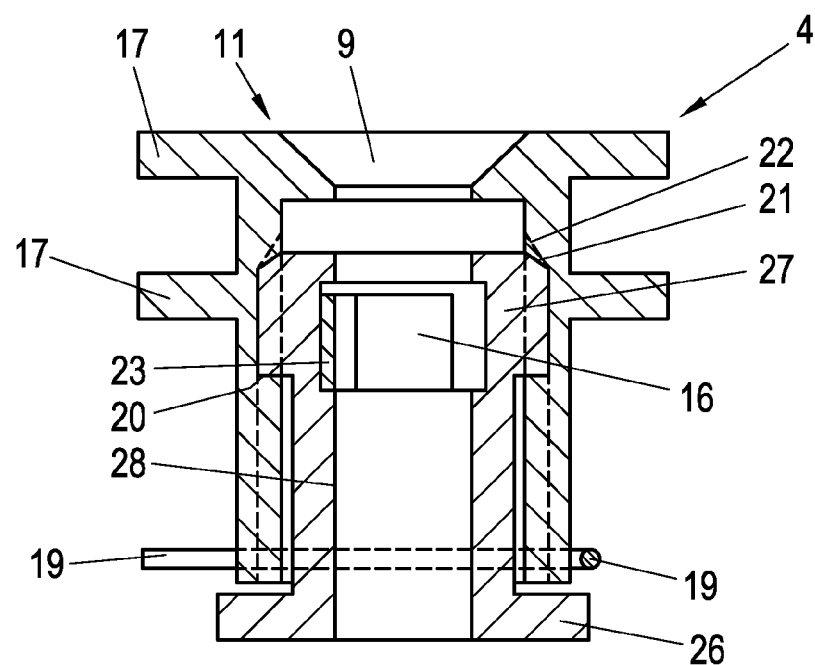
FIG. 4A is a longitudinal section of the device according to the invention in the shorter state in accordance with the distance position shown in FIG. 1.
Figure 4B:
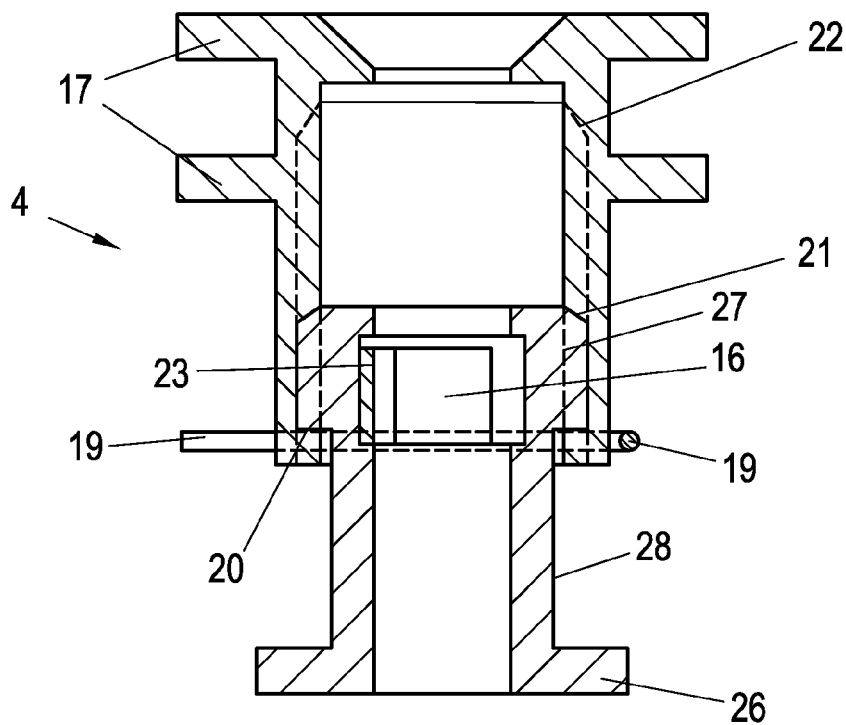
FIG. 4B is a longitudinal section of the device according to the invention in a longer state in accordance with the abutment position shown in FIG. 2.

As can be seen from FIGS. 3, 4A and 4B, stops are provided for limiting the movement of the distance compensation element 8 in the axial direction relative to the insertion part 11. For this purpose, the distance compensation element 8 comprises, on the one hand, receiving openings 18 for detachably receiving an abutment element 19, by which unscrewing the distance compensation element 8 from the insertion part 11 is prevented in the mounted state. In the shown embodiment a U-shaped clip element 19' is provided as abutment element 18, which clip element 19' is inserted with its ends into the opposite receiving openings 18 of the distance compensation element 8. In the mounted state, the clip element 19' projects into the longitudinal bore 9 of the distance compensation element 8, so that a movement of the distance compensation element 8 beyond an abutment position abutting on an abutment surface 20 of the distance compensation element 8 is blocked. The clip element 19' is made of an elastic material, so that the projecting ends are bendable in the mounted state (cf. FIG. 3). In this manner, an unintentional removal of the clip element 19' can be avoided. In addition, the distance compensation element 8 comprises a stop 21 on the end received in the insertion part 11, which stop abuts on a corresponding stop 22 of the insertion part 11 in the state of the device 4 having the smallest longitudinal extension corresponding to the distance position according to FIG. 1.

As can be seen from FIGS. 3 to 6, a spring element 16' is provided as entraining element 16, which spring element 16' is elastically deformable in engagement with the connection screw 7. The spring element 16' is arranged in a holding section 23 of the distance compensation element 8 in a torque-proof and axially immovable manner. In the shown embodiment, the spring element 16' comprises two expansion legs 24 arranged essentially in parallel to one another, which are connected to one another via a connecting section 25. The connecting section 25 comprises two connecting legs 25' arranged relative to one another at an obtuse angle. Upon screwing in of the connecting screw 7 the expansion legs 24 are pressed apart, thus causing a friction fit between the connecting screw 7 and the spring element 16'. Thus, the distance compensation element 8 is entrained upon screwing in of the connecting screw 7 in the abutment position on the holding element 5.

As can be seen from FIGS. 1 to 4B, the distance compensation element 8 comprises, on the one end, a foot part 26 for abutment on the holding element 5 and, on the other end, a head part 27 comprising the external thread for connection with the insertion part 11. The foot part 26 and the head part 27 are connected to one another via a longitudinal portion 28 having a cross-sectional surface which is smaller in comparison thereto.

The invention claimed is:

1. A structural element comprising at least one recess and a device for a spaced apart connection of the structural element with a holding element by means of a connection screw, the device being glued in place in the recess, the device having:

a distance compensation element comprising a longitudinal bore for the passage of the connection screw, an insertion part, the distance compensation element being connected to the insertion part via a screw connection, the insertion part comprising a fastening section that is arranged within the structural element for bonding with the structural element, the insertion part comprising at least one fastening flange on the fastening section, the fastening flange being arranged between outer surfaces of the structural element for bonding the insertion part with the structural element, the at least one fastening flange extending essentially perpendicularly to a longitudinal axis of the longitudinal bore, and an entraining element arranged in the longitudinal bore, in which the entraining element is connected to the connection screw by means of a friction fit, so that the distance compensation element is transferred from a distance position toward the holding element into an abutment position bridging a distance between the structural element and the holding element by screwing in of the connection screw toward the holding element, wherein stops are provided for limiting movement of the distance compensation element in an axial direction relative to the insertion part, wherein the distance compensation element comprises a receiving opening for detachably receiving an abutment element, by which unscrewing the distance compensation element from the insertion part is blocked in a mounted state, and wherein the abutment element is provided as a U-shaped clip element, which in the mounted state projects into the longitudinal bore of the distance compensation element.

2. The structural element according to claim 1, wherein the distance compensation element is transferred from the distance position toward the holding element into the abutment position on the holding element upon screwing in of the connection screw.

3. The structural element according to claim 1, wherein the insertion part comprises two fastening flanges on the fastening section.

4. The structural element according to claim 3, wherein at least one of the fastening flanges comprises at least one opening for introducing an adhesive between the fastening flanges.

5. The structural element according to claim 3, wherein the fastening flanges are parallel and spaced apart.

6. The structural element according to claim 1, wherein a spring element is provided as the entraining element, which spring element is elastically deformable by means of the connection screw.

7. The structural element according claim 6, wherein the spring element is arranged in a holding section of the distance compensation element in a torque-proof and axially immovable manner.

8. The structural element according to claim 7, wherein the spring element comprises two expansion legs that are spread by means of the connection screw and are arranged essentially in parallel to one another, in which the expansion legs are connected to one another via a connecting section.

9. The structural element according to claim 1, wherein a bush element is provided as the insertion part, wherein the bush element comprises an internal thread for connection with a corresponding external thread of the distance compensation element.

10. The structural element according to claim 1, wherein the fastening section of the insertion part is arranged essentially completely within the recess of the structural element.

11. The structural element according to claim 1, wherein a plate element is provided, the fastening section of the insertion part being arranged between outer surfaces of the plate element.

12. The structural element according to claim 1, wherein the holding element comprises a nut for connection with the connection screw.

13. The structural element according to claim 1, wherein the structural element is made from a fiber-reinforced plastic composite material.

14. A structural element comprising at least one recess and a device for a spaced apart connection of the structural element with a holding element by means of a connection screw, the device being glued in place in the recess, the device having:

a distance compensation element comprising a longitudinal bore for the passage of the connection screw, an insertion part, the distance compensation element being connected to the insertion part via a screw connection, the insertion part comprising a fastening section that is arranged within the structural element for bonding with the structural element, the insertion part comprising at least one fastening flange on the fastening section, the fastening flange being arranged between outer surfaces of the structural element for bonding the insertion part with the structural element, the at least one fastening flange extending essentially perpendicularly to a longitudinal axis of the longitudinal bore, and an entraining element arranged in the longitudinal bore, in which the entraining element is connected to the connection screw by means of a friction fit, so that the distance compensation element is transferred from a distance position toward the holding element into an abutment position bridging a distance between the structural element and the holding element by screwing in of the connection screw toward the holding element, wherein a bush element is provided as the insertion part, wherein the bush element comprises an internal thread for connection with a corresponding external thread of the distance compensation element, and wherein the distance compensation element comprises on its one end a foot part for abutment on the holding element and on its other end a head part with an external thread, the foot part and the head part being connected to one another via a longitudinal section having a cross-sectional surface which is smaller in comparison to the foot part and the head part.

* * * * *